United States Patent [19]

Niki et al.

[11] Patent Number: 5,110,211
[45] Date of Patent: May 5, 1992

[54] OPTICAL INTERFERENCE SIGNAL EXTRACTOR WITH DEVICE FOR REDUCED NOISE FROM OPTICAL LIGHT POWER VARIATION

[76] Inventors: Shoji Niki, 2-171-1, Fukiagemachi Shinjuku, Kitaadachi-gun, Saitama, Japan; Jonathan R. Pawlik, 600 Mountain Ave., Murray Hill, N.J. 07974

[21] Appl. No.: 461,048

[22] Filed: Jan. 4, 1990

[51] Int. Cl.$^5$ .............................................. G01B 9/02
[52] U.S. Cl. .................................... 326/346; 356/358
[58] Field of Search ............... 356/345, 346, 358, 349, 356/360

[56] References Cited

U.S. PATENT DOCUMENTS 4,759,628  7/1988  Tatsuno et al. ...................... 356/349

FOREIGN PATENT DOCUMENTS 2621753  10/1987  France .
0019701   1/1990  Japan ................................... 356/358

OTHER PUBLICATIONS

Review of Scientific Instruments, vol. 59, No. 2, Feb. 1988, pp. 242-248, New York, U.S., F. Ozanam et al.: "Fourier transform electromodulated, infrared spectrometer for studies at the electrochemical interface".
IBM Technical Disclosure Bulletin, vol. 17, No. 7, Dec. 1974, pp. 1927-1928, New York, U.S.; F. Buckley, III: "Automatic gain control system".
J. E. E. Journal of Electronic Engineering, vol. 23, No. 236, Aug. 1986, pp. 58-60; N. Arakawa: "Optical spectrum analyer: New Techniques and new functions".
Applied Optics, vol. 13, No. 4, Apr. 1974, pp. 723-725; R. J. Douglas et al. "Simple double-beam modification for far infrared interferometers".

Primary Examiner—Samuel A. Turner
Attorney, Agent, or Firm—Staas & Halsey

[57] ABSTRACT

In a device which extracts an optical interference signal for analyzing the spectrum of light to be measured, the light to be measured is incident to an optical interferometer capable of sweeping an optical path difference and interference light output therefrom is converted into an electric signal to obtain an optical inteference signal. On the other hand, the optical power of the light to be measured is extracted to create an optical power signal, which is provided to a divider, wherein the optical interference signal is divided by the optical power signal to obtain a noise-free optical interference signal.

10 Claims, 4 Drawing Sheets

OPTICAL INTERFERENCE SIGNAL EXTRACTOR WITH DEVICE FOR REDUCED NOISE FROM OPTICAL LIGHT POWER VARIATION

BACKGROUND OF THE INVENTION

The present invention relates to an optical interference signal extractor for use in measuring the spectral distribution of light.

Figure 1:
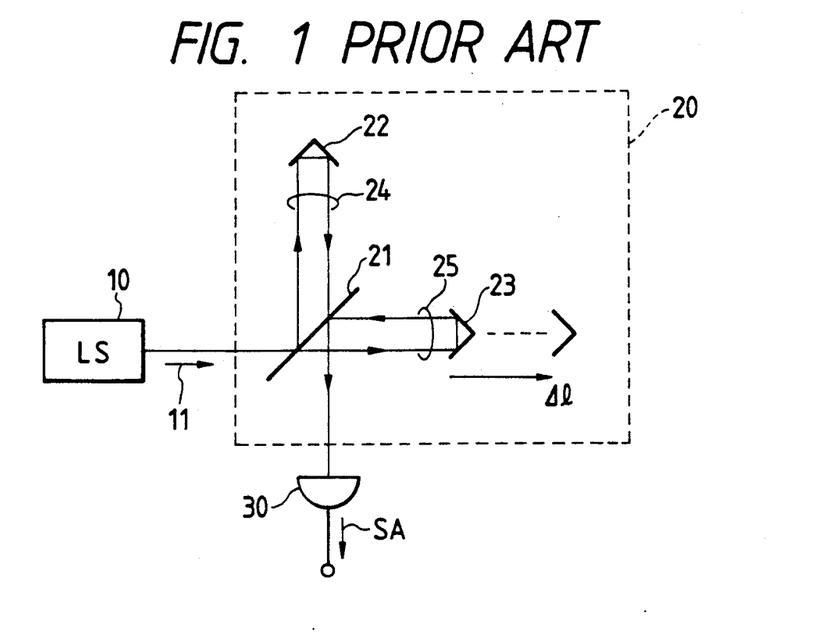
FIG. 1 is a block diagram for explaining the prior art.

FIG. 1 shows a conventional optical interference signal extractor. Reference numeral 10 indicates a light source for emitting light 11 to be measured and 20 an optical interferometer capable of sweeping an optical path difference, that is, capable of continuously changing an optical path difference. In this example the optical interferometer 20 is shown to be a Michelson interferometer but may also be a Fabry-Perot interferometer.

The Michelson interferometer 20 comprises a half mirror or semitransparent mirror 21 for splitting and combining light, a fixed mirror 22 for forming a fixed optical path 24, and a movable mirror 23 for forming a variable optical path 25.

The light 11 emitted from the light source 10 is split by the half mirror 21 to the fixed optical path 24 and the variable optical path 25, and light from the former and light from the latter are coupled together or combined by the half mirror 21 into a beam of light, which is converted by a photodetector 30 into an electric signal SA.

Figure 2:
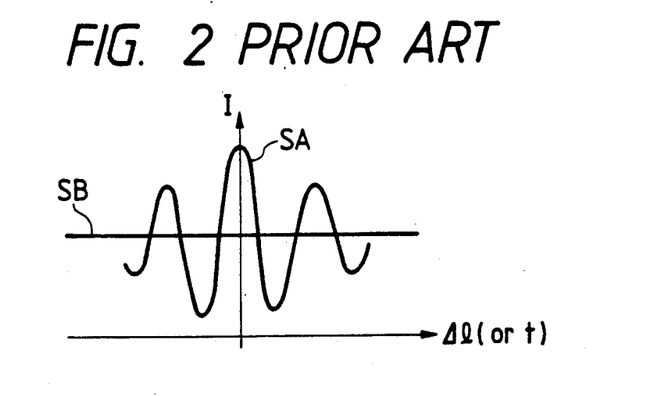
FIG. 2 is a waveform diagram for explaining the waveform of an optical interference signal.

The light having passed through the fixed optical path 24 and the light having passed through the variable optical path 25 have a phase difference owing to the optical path difference, and hence interfere with each other when they are coupled together by the half mirror 21. The interference of light varies as the movable mirror 23 moves. In other words, the intensity of the interference light from the optical interferometer 20 repeatedly varies corresponding to interference fringes as the movable mirror 23 moves. The intensity variation of the interference light corresponding to the distance of movement Δl of the movable mirror 23 from the position where the optical path difference is zero is measured by conversion into the level of an electric signal by the photodetector 30, whereby such an optical interference signal SA as shown in FIG. 2 can be obtained. The movement of the movable mirror 23 for the distance Δl causes an optical path difference of 2Δl, but in the following description, the distance of movement Δl may sometimes be referred to as the optical path difference for the sake of simplicity. By a frequency analysis of the interference signal SA through Fourier transformation, the spectral distribution of the light to be measured 11 can be obtained. Where the moving speed of the movable mirror 23 is made constant, time t corresponding to the distance of its movement may be represented on the abscissa in FIG. 2.

Figure 3:
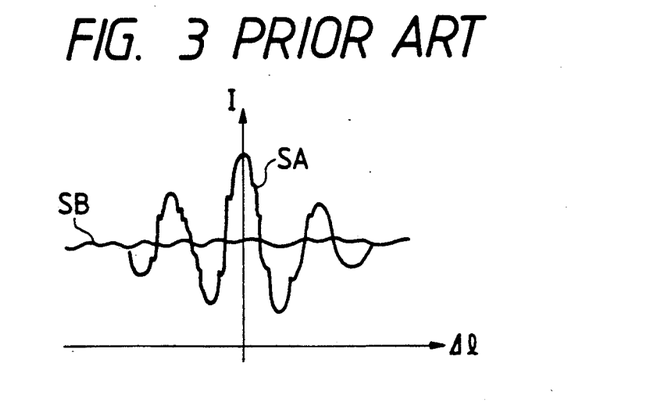
FIG. 3 is a waveform diagram showing an optical interference signal affected by optical power variations.

FIG. 2 shows the waveform of the interference signal SA when the optical power of the light to be measured 11 is stable. Where the optical power (indicated by SB in FIG. 2) of the light 11 is stable, an interference signal of a good SN ratio can be obtained. On the other hand, where the optical power SB of the light 11 fluctuates as depicted in FIG. 3, the SN ratio of the interference signal SA becomes poor, and the results of its frequency analysis contain, as spectral, also high-order modulation components resulting from the fluctuation in the optical power of the light 11, making it impossible to accurately measure the wavelength distribution in the light 11.

SUMMARY OF THE INVENTION

It is therefore an object of the present invention to provide an optical interference signal extractor which permits the removal of a noise resulting from a variation in the optical power of light to be measured.

The optical interference signal extractor of the present invention has an arrangement in which interference light emitted from an optical interferometer is converted by a photodetector into an electric signal to obtain an optical interference signal, a power signal corresponding to the optical power of light to be measured which contains the optical power fluctuation component is detected, and then the optical interference signal is divided by the power signal. The power signal may be obtained either by applying the optical interference signal to a low-pass filter or by directly converting the light to be measured into an electric signal through use of a second photodetector.

By dividing the optical interference signal by the power signal, it is possible to extract an optical interference signal which does not contain the noise resulting from the optical power variation. For example, in the case of observing a light spectrum, such a noise-free optical interference signal precludes the possibility of a noise spectrum being superimposed on the light spectrum, and consequently, the correct light spectrum can be observed.

DESCRIPTION OF THE PREFERRED EMBODIMENTS

Figure 4:
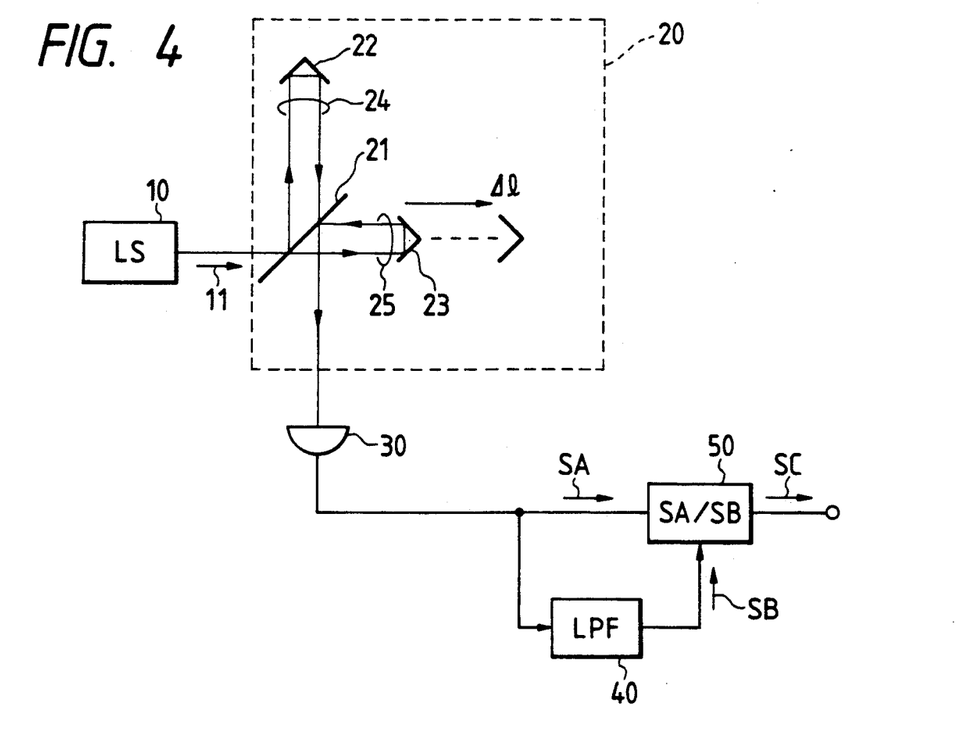
FIG. 4 is a block diagram illustrating an embodiment of the present invention.

FIG. 4 illustrates in block form an embodiment of the present invention. In FIG. 4 the parts corresponding to those in FIG. 1 are identified by the same reference numerals, and since the arrangement of the optical interferometer 20, which is an optical system for measuring the light 11 from the light source 10, is exactly the same as shown in FIG. 1, no description will be given of the optical interferometer 20. In this embodiment, the optical interference signal SA from the photodetector 30 is branched to a low-pass filter 40, wherein a low-frequency component SB of the optical interference signal SA is extracted.

The low-frequency component SB of the optical interference signal SA is a DC-like optical power signal SB of the light 11 containing a low-frequency variation component. That is, where the light source 10 is being excited by the commercial power line, a noise of 50 or 60 Hz, or 100 or 120 Hz gets mixed in the optical interference signal SA. Also in the case of DC lighting, a fluctuation in the DC power source voltage brings about a low-frequency optical power variation. The optical power signal SB containing this optical power variation as a noise component is extracted by the low-pass filter 40 and is applied to an arithmetic unit 50.

The optical interference signal SA from the photodetector 30 is also provided to the arithmetic unit 50, wherein it is divided by the optical power signal SB, obtaining an optical interference signal SC with no noise component.

Letting the power level of the light 11 from the light source 10 be represented by $I_B$ and the wavelength of arbitrary light in the frequency band in which an analysis is made, for example, the center frequency, be represented by $\lambda_O$, the waveform of the optical interference signal SA at the power level $I_A$ shown in FIG. 2 can be given by the following expression:

$$I_A = I_B + I_B \gamma \cos 2\pi \frac{2\Delta l}{\lambda_0} \quad (1)$$

where $\gamma$ is referred to as coherency, which represents interference light components at wavelengths except $\lambda_O$ and varies with the distance of movement $\Delta l$ of the movable mirror 23. Further, $2\Delta l/\lambda_O$ is called a fringe frequency. In FIG. 4, letting the moving speed of the movable mirror 23 be represented by V, then $\Delta l = Vt$, so that Expression (1) can be expressed as follows:

$$I_A = I_B + I_B \gamma \cos 2\pi \frac{2\Delta l}{\lambda_0} = I_B + I_B \gamma \cos 2\pi f_F \cdot t \quad (2)$$

where $f_F$ represents the fundamental frequency of the optical interference signal SA, such as shown in FIG. 2, detected by the photodetector 30 while moving the movable mirror 23 at the speed V in FIG. 4, and this fundamental frequency may sometimes be called the fringe frequency. In practice, the moving speed of the movable mirror 23 is selected such that the fringe frequency $f_F$ is about 50 kHz, for instance.

The power $I_B$ of the light 11 emitted from the light source 10 fluctuates as mentioned previously in respect of FIG. 3, and letting its fluctuation component and DC component be represented by $\Delta I(t)$ and $I_O$, respectively, the power $I_B$ of the light 11 is expressed as follows:

$$I_B = I_O + \Delta I(t) \quad (3)$$

The fluctuation component $\Delta I(t)$ modulates the amplitude of the optical interference signal as is evident from Expression (3), so that even if the frequency of the fluctuation component $\Delta I(t)$ (taken as $f_n$) is sufficiently lower than the fringe frequency $f_F$, spectra of $f_F \pm f_n$ and $f_F \pm 2f_n$, for example, appear as noise in the vicinity of the fringe frequency $f_F$ in the frequency band to be measured. Consequently, the waveform of the optical interference signal SA, which is actually detected by the photodetector 30, contains noise components as depicted in FIG. 3. In the embodiment shown in FIG. 4, the light power signal SB which is the input light 11, given by Expression (3), is extracted by the low-pass filter 40 from the optical interference signal SA which is the output of the photodetector 30, given by Expression (1), and the ratio SA/SB between the levels of the signals SA and SB is computed by the arithmetic unit 50. From Expressions (2) and (3) the level ratio SA/SB is expressed as follows:

$$SA/SB = I_A/I_B = 1 + \pi \cos 2\pi f_F \cdot t \quad (4)$$

Since the output signal SC of the computing element 50 is free from the influence of the power fluctuation of the input light 11 as is evident from Expression (4), its waveform is substantially the same as that of the optical interference signal shown in FIG. 2 which is provided when the power of the input light 11 undergoes no fluctuation. Consequently, an accurate spectrum of the input light 11 can be obtained by a frequency analysis of the output signal SC of the arithmetic unit 50 through the fast Fourier transformation, for instance. In this embodiment, by selecting the cut-off frequency of the low-pass filter 40 to be lower than the band of the fringe frequency corresponding to the spectrum measuring band, all noises attributable to fluctuation components lower than the above-mentioned cut-off frequency can be removed from the optical interference signal SA.

Figure 5:
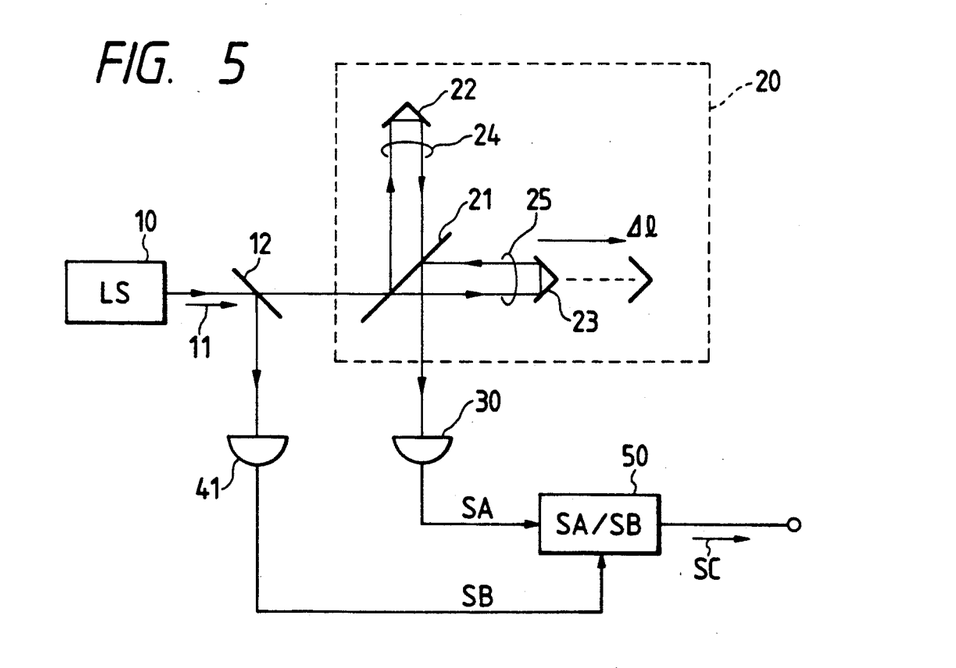
FIG. 5 is a block diagram illustrating another embodiment of the present invention.

Although in the FIG. 4 embodiment the optical power signal SB corresponding to the power of the incident light 11 is extracted by the low-pass filter 40 from the optical interference signal SA which is the output of the photodetector 30, the power of the light 11 from the light source 10 may also be detected directly as the optical power signal SB. An embodiment therefor is depicted in FIG. 5, in which the light 11 emitted from the light source 10 is split by a half mirror 12 into light which passes through the half mirror 12 and is then incident to the optical interferometer 20 and light which is reflected by the half mirror 12 and is then incident to a second photodetector 41. The power signal SB corresponding to the power of the light 11 is detected by the second photodetector 41 and is provided to the arithmetic unit 50 for the division SA/SB. The other parts of this embodiment are the same as those in the FIG. 4 embodiment and no description will be given of them for the sake of simplicity. According to the FIG. 5 embodiment, all noises attributable to fluctuation components in the entire frequency band contained in the light 11 can be removed from the optical interference signal SA.

Figure 6:
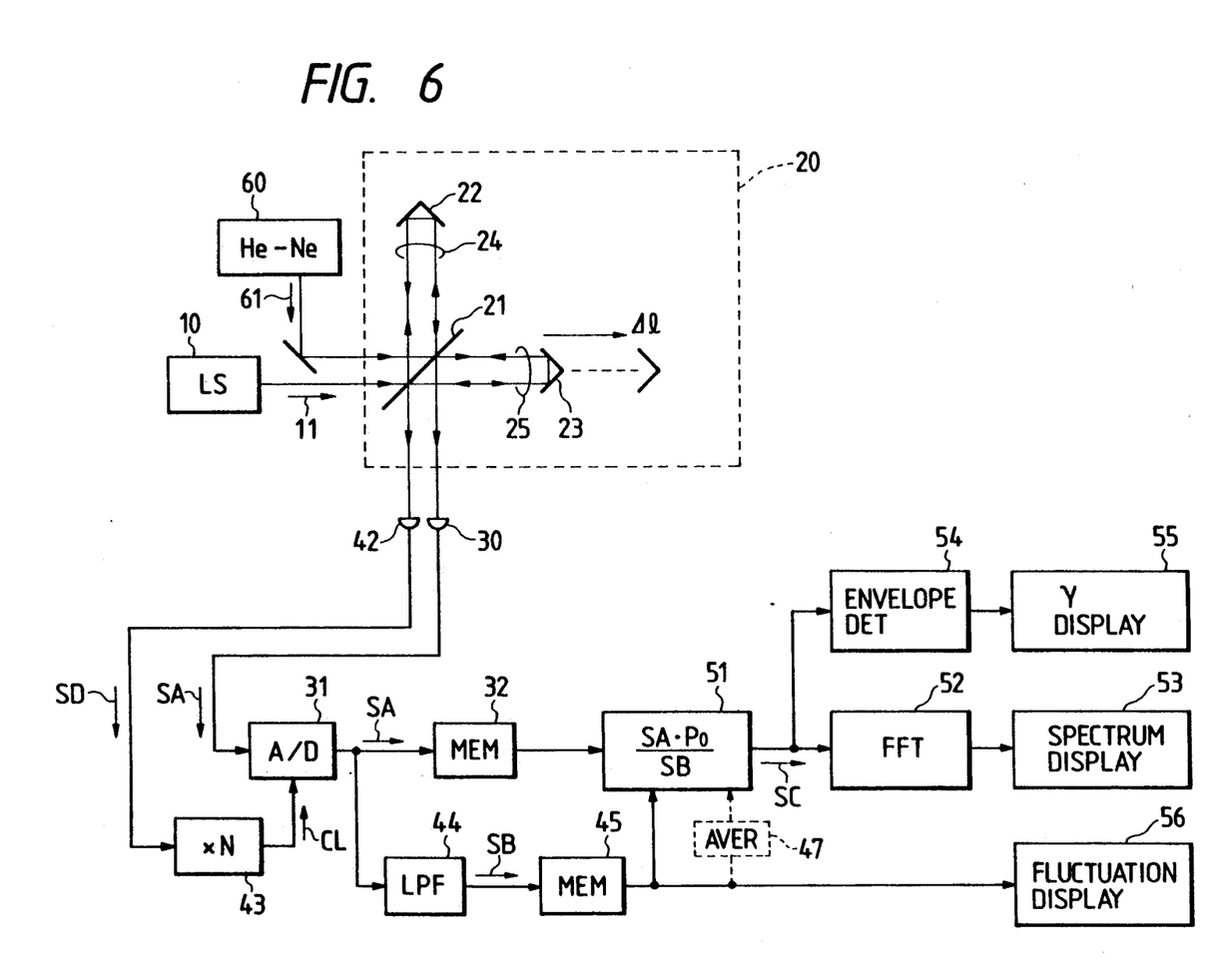
FIG. 6 is a block diagram illustrating another embodiment of the present invention.

FIG. 6 illustrates a modified form of the embodiment shown in FIG. 4.

As described previously, the optical interference signal SA is obtained at the output of the photodetector 30 as the movable mirror 23 of the optical interferometer 20 moves at a constant speed, but if the moving speed of the movable mirror 23 varies, the fringe frequency of the optical interference signal SA also fluctuates accordingly and no accurate results of spectrum analysis can be obtained. In the embodiment shown in FIG. 6 reference light which has a line spectrum of a stable wavelength, such as laser light, is applied to the optical interferometer 20, together with the light to be measured, and a reference optical interference signal is derived from reference interference light which is emitted from the optical interferometer 20. The optical interference signal of the light to be measured is sampled by a clock of the fringe frequency of the reference optical interference signal or a frequency N times higher than the fringe frequency, by which samples of the optical interference signal corresponding to the distance of movement of the movable mirror 23 are successively generated without being affected by the variation in the moving speed of the movable mirror 23.

In this embodiment a reference light source 60 is provided in addition to the light source 10 and reference light 61 emitted from the reference light source 60 is applied to the optical interferometer 20, together with the light to be measured 11, as shown in FIG. 6. The reference light source 60 is one that is stable in wavelength and has a narrow spectrum characteristic, such as a He-Ne laser. In the optical interferometer 20 the reference light 61 is also split to the fixed optical path 24 and the variable optical path 25 and both rays of light therefrom are combined by the half mirror 21 into reference interference light, which is received by a photodetector 42 for conversion into an electric signal.

By using, as the reference light source 60, a light source which emits light of a stable wavelength and a narrow spectrum characteristic, the amplitude of a reference optical interference signal SD which is provided from the photodetector 42 varies sinusoidally with a constant period, i.e. a constant fringe frequency, with respect to the distance of movement Δl of the movable mirror 23. In other words, the reference optical interference signal SD has a peak for each fixed distance of movement of the movable mirror 23. Where the moving speed of the movable mirror 23 changes, the position of the peak also changes correspondingly on the time axis. The reference optical interference signal SD is provided to an N-multiplier 43, from which an N-multiplied signal is applied as a sampling clock CL to an A-D converter 31, wherein the level of the optical interference signal SA of the light to be measured 11 from the photodetector 30 is converted to a digital value for each sampling clock CL. The value of N of the N-multiplier 43 is selected such that the frequency of the sampling clock CL is more than twice higher than the fringe frequency of the optical interference signal SA.

The sample data available from the A-D converter 31 is provided to a memory 32, in which sample data of one sweep of the movable mirror 23 is written in association with the sweep. The sample data from the A-D converter 31 is provided also to a digital low-pass filter 44, by which a low-frequency component containing the DC component and the fluctuation component of the power of the input light 11 is extracted as the optical power signal SB, and data about the optical power signal SB of one sweep of the movable mirror 23 is also written into a memory 45.

After completion of the write of the data of one sweep, the data SA and SB are read out of the memories 32 and 45 and provided to an arithmetic unit 51, wherein the division SA/SB described above with regard to FIG. 4 is performed to obtain the optical interference signal data SC from which the fluctuation component has been removed. The data SC thus obtained may be subjected to, for example, a spectrum analysis by an FFT analyzer 52, by which the spectrum of the input light 11 can be obtained.

The optical interference signal SC obtained by the division SA/SB does not include the term of the power $I_B$ of the input light 11 as seen from Expression (4), and consequently, the spectral component obtained through frequency analysis of the result of the division SA/SB has been normalized by the power $I_B$ of the input light 11 and is unrelated to the power level of the input light 11. That is, if the spectrum distribution of the input light 11 remains unchanged, spectra of the same amplitudes are obtained irrespective of the magnitude of the power of the input light 11, and the results of analysis do not contain information about the power level of the input light 11. In the FIG. 6 embodiment, the arithmetic unit 51 multiplies the result of the division SA/SB by the power level $P_O$ of the input light 11 as a coefficient so as to obtain a spectrum of an amplitude proportional to the power of the input light 11. Consequently, the output data SC of the arithmetic unit 51 assumes a value proportional to the power level $P_O$ of the input light 11, and the amplitude of the spectrum obtained by the frequency analysis of the data SC becomes also proportional to the power level $P_O$. The coefficient $P_O$ that is used here is one of the data written in the memory 45, preferably, that data SB of a series of data stored in the memory 45 for one sweep which corresponds to the center position of the sweep. More preferably, the movable mirror 23 of the optical interferometer 20 is moved for a distance from $-\Delta l$ to $+\Delta l$ in terms of the optical path difference between the fixed and movable optical paths 24 and 25, and the optical power data SB at an address corresponding to the vicinity of the position where the optical path difference is zero is read out of the memory 45 and is used as the coefficient $P_O$. Still more preferably, the optical power data SB in a predetermined number of periods before and after the position of zero optical path difference are read out of the memory 45 and averaged by an averager 47 indicated by the broken line in FIG. 6, and the resulting averager is used as the coefficient $P_O$. In this instance, the coefficient $P_O$ is less affected by the fluctuation component contained in the optical power.

The computing element 51 outputs the optical interference signal SC from which the noise component has been removed. By a frequency analysis of the optical interference signal SC with the frequency analyzer 52, the optical spectrum of the light 11 to be measured can be displayed on a display 53. Moreover, an envelope detector 54 is provided, by which a variation in the amplitude of the optical interference signal SC, that is, the coherency $\gamma$ in Expression (4), is detected. By displaying the coherency $\gamma$ on a display 55 with the optical path difference Δl represented on the abscissa, the coherency of the light 11 being measured can be displayed. Besides, fluctuations of the light 11 can be observed by displaying on a display 56 the optical power signal data SB read out of the memory 45.

Figure 7:
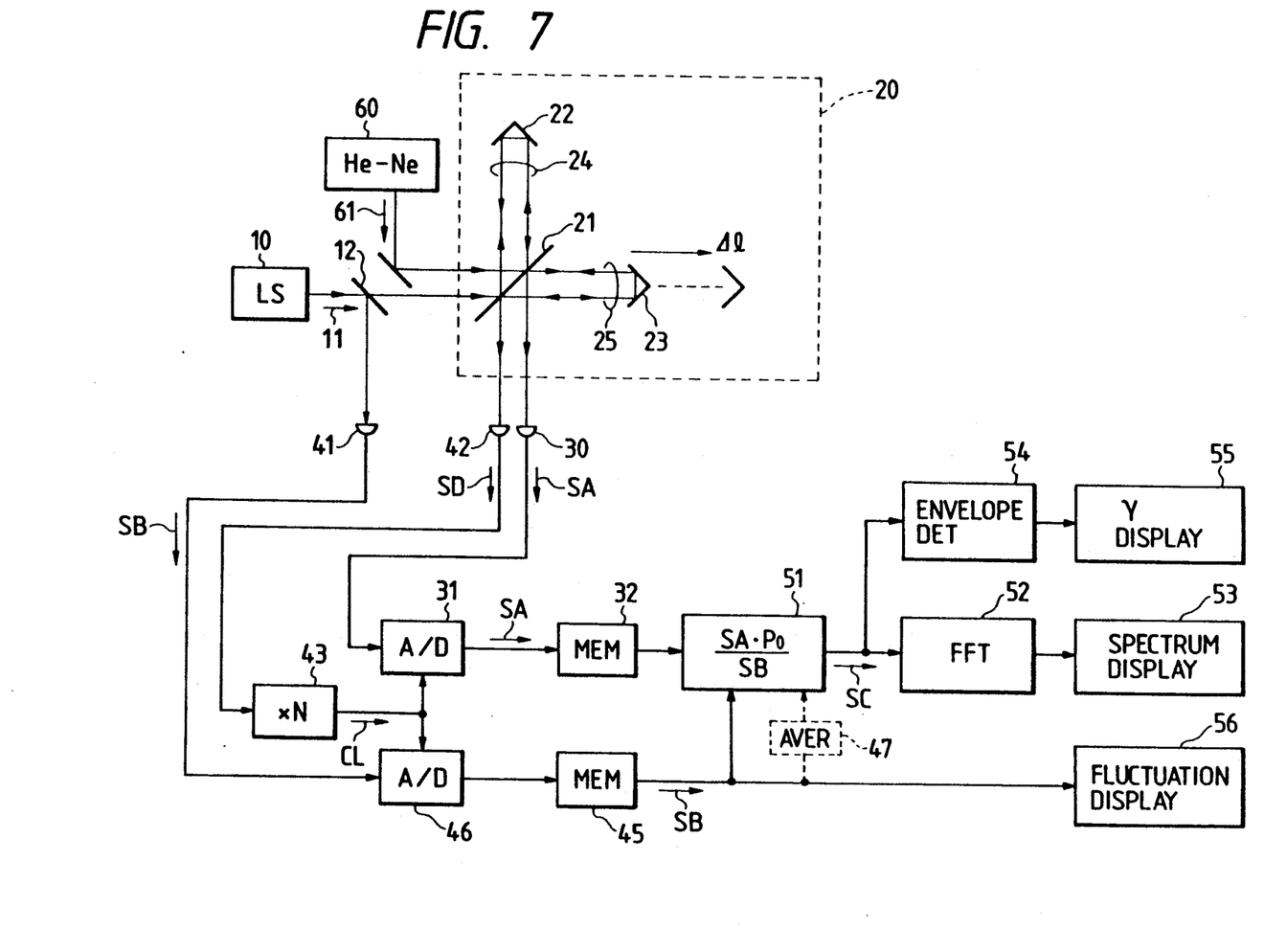
FIG. 7 is a block diagram illustrating still another embodiment of the present invention.

FIG. 7 illustrates another modification of the FIG. 4 embodiment, in which the method of employing the reference light 61 is applied to the FIG. 5 embodiment as is the case with the FIG. 6 embodiment. In FIG. 7 the parts corresponding to those in FIGS. 5 and 6 are identified by the same reference numerals and characters. As depicted in FIG. 7, a portion of the light 11 emitted from the light source 10 is reflected by the half mirror 12 to the photodetector 41, wherein the power of the light 11 is converted to the electric signal SB, which is applied to an A-D converter 46. The A-D converter 46 converts the level of the optical power signal SB into a digital value upon each application thereto of the sampling clock CL derived by the N-multiplier 43 from the optical interference signal SD of the reference light 61. The output data of the A-D converter 46 is written into the memory 45 in association with the sweep of the movable mirror 23. The construction and the operation of this embodiment are identical with the FIG. 6 embodiment, and hence no further description will be repeated.

As described above, according to the present invention, even if the optical power of the light to be measured 11 fluctuates, an optical interference signal free from the fluctuation component can be obtained.

It will be apparent that many modifications and variations may be effected without departing from the scope of the novel concepts of the present invention.

What is claimed is:

1. An optical interference signal extractor comprising:
    an optical interferometer which receives light to be measured and in which an optical path difference for outputting interference light of said light to be measured is sweepable;
    optical interference signal generating means for receiving the interference light incident from said optical interferometer and outputting a first optical interference signal that is an electric signal corresponding to the interference light;
    optical power signal extracting means for generating an optical power signal corresponding to the power of the light to be measured; and
    arithmetic means for dividing the first optical interference signal from said optical interference signal generating means by the optical power signal from said optical power signal extracting means and for outputting the result of the division as a second optical interference signal,
    wherein said optical interference signal generating means includes a first photodetector which receives and converts the interference light to an electric signal; an A-D converter which converts the output of said first photodetector to a digital signal and outputs the digital signal as the first optical interference signal; a reference light source for emitting reference light of a narrow spectrum which is applied to said optical interferometer, together with the light to be measured; a second photodetector for converting reference interference light emitted from said optical interferometer into an electric signal in accordance with the reference light; and a multiplier which multiplies the frequency of the output signal of said second photodetector to a desired frequency and applies the multiplied output as a sampling clock to said A-D converter; and wherein said optical power signal extracting means includes a digital low-pass filter which is supplied with the output of said A-D converter and has a predetermined cut-off frequency for extracting the optical power signal in digital form.

2. The optical interference signal extractor of claim 1 wherein said arithmetic means includes: a first memory for storing said first optical interference signal output from said A-D converter; a second memory for storing said optical power signal output from said digital low-pass filter; and dividing means supplied with said first optical interference signal and said optical power signal read out of said first and second memories, for dividing said first optical interference signal by said optical power signal.

3. The optical interference signal extractor of claim 2 wherein said arithmetic means includes multiplying means whereby the divided output of said dividing means is multiplied by one of sample data of said optical power signal read out of said second memory, as a constant coefficient, the multiplied output of said multiplying means being output as said second optical interference signal.

4. The optical interference signal extractor of claim 2 wherein said arithmetic means includes: averaging means for averaging a plurality of sample data of said optical power signal read out of said second memory and providing the averaged output as a constant coefficient; and multiplying means for multiplying said constant coefficient and said divided output of said dividing means and providing the multiplied output as said second optical interference signal.

5. The optical interference signal extractor of claim 2 wherein the cut-off frequency of said low-pass filter is lower than a frequency band for measuring said optical interference signal corresponding to a wavelength region for measuring said light to be measured.

6. The optical interference signal extractor of claim 1 wherein the cut-off frequency of said low-pass filter is lower than a frequency band for measuring said optical interference signal corresponding to a wavelength region for measuring said light to be measured.

7. An optical interference signal extractor comprising:
    an optical interferometer which receives light to be measured and in which an optical path difference for outputting interference light of said light to be measured is sweepable;
    optical interference signal generating means for receiving the interference light incident from said optical interferometer and outputting a first optical interference signal that is an electric signal corresponding to the interference light;
    optical power signal extracting means for generating an optical power signal corresponding to the power of the light to be measured; and
    arithmetic means for dividing the first optical interference signal from said optical interference signal generating means by the optical power signal from said optical power signal extracting means and for outputting the result of the division as a second optical interference signal,
    wherein said optical interference signal generating means includes a first photodetector which receives and converts the interference light into an electric signal; a first A-D converter for converting the output of said first photodetector into a digital signal for output as the first optical interference signal; a reference light source for emitting reference light of a narrow spectrum which is applied to said optical interferometer, together with the light to be measured; a second photodetector for converting reference interference light emitted from said optical interferometer into an electric signal in accordance with the reference light; and a multiplier which multiplies the frequency of the output signal of said second photodetector to a desired frequency and applies the multiplied output as a sampling clock to said first A-D converter; and wherein said optical power signal extracting means includes a third photodetector which receives a portion of the light to be measured, detects the power of the light to be measured and outputs the detected power as the optical power signal; and a second converter connected to the output of said third photodetector, for converting the optical power signal into a digital optical power signal upon each application of the sampling clock from said multiplier.

8. The optical interference signal extractor of claim 7 wherein said arithmetic means includes: a first memory for storing said first optical interference signal output from said first A-D converter; a second memory for storing said optical power signal output from said second A-D converter; and dividing means supplied with said first optical interference signal and said optical power signal read out of said first and second memories, for dividing said first optical interference signal by said optical power signal.

9. The optical interference signal extractor of claim 8 wherein said arithmetic means includes multiplying means whereby the divided output of said dividing means is multiplied by one of sample data of said optical power signal read out of said second memory, as a constant coefficient, the multiplied output of said multiplying means being output as said second optical interference signal.

10. The optical interference signal extractor of claim 8 wherein said arithmetic means includes: averaging means for averaging a plurality of sample data of said optical power signal read out of said second memory and providing the averaged output as a constant coefficient; applying means for multiplying said constant coefficient and said divided output of said dividing means and providing the multiplied output as said second optical interference signal.

* * * * *

UNITED STATES PATENT AND TRADEMARK OFFICE
CERTIFICATE OF CORRECTION

PATENT NO. : 5,110,211
DATED : May 5, 1992
INVENTOR(S) : SHOJI NIKI et al.

It is certified that error appears in the above-identified patent and that said Letters Patent is hereby corrected as shown below:

On the title page, Item[52], U.S. Cl. "326" s/b --356--;
[56] OTHER PUBLICATIONS, "transform" s/b --transform,--.

Col. 1, lines 43, 49 and 50, "$\Delta 1$" s/b --$\Delta \ell$--.

Col. 3, line 68 (Eq.(4)), "$\pi\cos$" s/b --$\gamma\cos$--.

Col. 5, line 16, "$\Delta 1$" s/b --$\Delta \ell$--; and

Col. 6, lines 12 and 36, "$\Delta 1$" s/b --$\Delta \ell$--.

Signed and Sealed this

Fifth Day of October, 1993

Attest:

BRUCE LEHMAN

*Attesting Officer*  *Commissioner of Patents and Trademarks*